United States Patent [19]

McKenzie

[11] 4,153,094
[45] May 8, 1979

[54] SECTIONAL TIRE

[76] Inventor: Ross A. McKenzie, 2 Brule Ter., Toronto, Ontario, Canada, M63 1M3

[21] Appl. No.: 772,359

[22] Filed: Feb. 28, 1977

[51] Int. Cl.² ............................................ B60C 19/00
[52] U.S. Cl. .................................. 152/334; 152/306; 152/362 R
[58] Field of Search ............... 152/333, 334, 335, 306, 152/305, 300, 362 R, 379.1, 379.2, 398, 307, 308, 309

[56] References Cited

U.S. PATENT DOCUMENTS

| 779,730 | 1/1905 | Neary | 152/362 R X |
| 1,054,312 | 2/1913 | Prince et al. | 152/334 |
| 1,130,886 | 3/1915 | Byam | 152/306 |
| 1,658,426 | 2/1928 | Buffo | 152/334 |
| 1,845,583 | 2/1932 | Des Rosiers | 152/306 X |
| 2,427,216 | 9/1947 | Kraft | 152/379.2 X |
| 3,106,951 | 10/1963 | Hurdel | 152/334 |
| 3,561,821 | 2/1971 | Pellegrino | 152/334 X |
| 3,951,192 | 4/1976 | Gardner et al. | 152/379.1 |

FOREIGN PATENT DOCUMENTS 893164  10/1953  Fed. Rep. of Germany ...... 152/362 R

Primary Examiner—Francis S. Husar
Assistant Examiner—Randolph A. Reese

[57] ABSTRACT

A tire section individually securable to a wheel rim with other tire sections to form a tire so that such sections are replaceable when worn or damaged is disclosed comprising an improvement in which a substantially flexible tire section having a flat area is secured to a sealing adaptor plate through a steel ring mounting member integral with the tire section. The steel ring may be mounted in the bead of the tire, the bead facing inwardly or outwardly. Either a bolt or a clamp may be employed to secure the tire section to a flat sealing adaptor plate. The adaptor plate in turn may be mounted on a tire rim surface lying in a circumferential plane transversely extending from a wheel.

12 Claims, 6 Drawing Figures

SECTIONAL TIRE

SUMMARY OF THE INVENTION

The present invention relates to a tire section individually securable to a wheel rim with other tire sections to form a tire having such sections that are replaceable when worn or damaged. The improvement embodied by the present invention comprises a substantially flexible tire section member extending from a bottom area into side walls and a tread surface. The bottom area lies in a flat plane positionable next adjacent to a tire rim surface lying in a circumferential plane transversely extending from a wheel. A steel ring mounting member extends substantially around the periphery of the bottom area and is employed for securing the tire section member next adjacent to a wheel rim. The mounting member is integral with the tire section member. A sealing adaptor plate member is provided which is removably securable to the tire section at the bottom area. Sealing members for removably securing the sealing adaptor plate member to the bottom area of the tire member is provided, the sealing member operatively engaging the steel ring mounting member.

The sealing adaptor plate member may lie in a first plane parallel to and flushly abuttable against the bottom area of the tire section member, the surface opposite the first plane being adapted to engage a tire rim surface lying in a circumferential plane transversely extending from a wheel. A fastening member may be provided for securing the tire section member through the adaptor plate member to a tire rim surface lying in a circumferential plane transversely extending from a wheel.

The opposite side of the first plane of the sealing adaptor plate member may comprise a second flat plane parallel to said first plane, said second plane having a section thereon adapted to tangentially engage a tire rim surface lying in a circumferential plane transversely extending from a wheel. Boss members are provided which extend outwardly from the ends of the second plane, the boss members being opposite said section.

The tire section member may comprise a pneumatic tire section and said steel ring may be mounted in the bead of said tire section, said bead extending around the periphery of the side walls of the tire.

The sealing member may comprise a plurality of threaded opening members in the steel ring mounting member, a plurality of bolt members being provided for threadably engaging the thread opening members and for sealing the adaptor plate member to the bottom area of the tire section member.

The bead may extend inwardly from the side wall of said tire section member or outwardly therefrom.

A plurality of continuous ribs may be provided which extend downwardly from the bottom area to sealingly engage the first plane of the sealing adaptor plate member.

The sealing member may comprise a clamp member for clampingly securing the bead to said sealing adaptor plate member.

A reinforcing band member may be provided which extends around the bottom periphery of the side wall member adjacent the bead.

DETAILED DESCRIPTION

The repair and/or maintenance of tires by providing a plurality of removable tire sections mounted on a wheel rim or tire tread surfaces is disclosed in the prior art U.S. Pat. Nos. Wolfe 3,770,038; Pellegrino 2,807,304; DesRosiers 1,845,583; Nimschke 1,494,797; VonKrenski 1,453,033; Barr 1,272,602 and Adams 1,200,291.

It is an object of the present invention to provide a novel tire section for mounting on a wheel rim and a novel apparatus for mounting such tire section on a wheel rim.

It is a further object of the present invention to provide a novel tire section that may be readily replaced due to wear or damage without requiring the removal of an entire tire which becomes increasingly difficult and costly where larger vehicles such as earth moving equipment are concerned.

It is a further object of the present invention to provide a novel apparatus comprising a pneumatic inflatable tire section which may be readily secured or removed from a wheel rim and in which the stress on the area sealed to the sealing adaptor is evenly distributed over a large portion of the seal.

These and other objects have been achieved according to the present invention and will become apparent by reference to the disclosure and claims that follow as well as the appended drawings.

Figure 1:
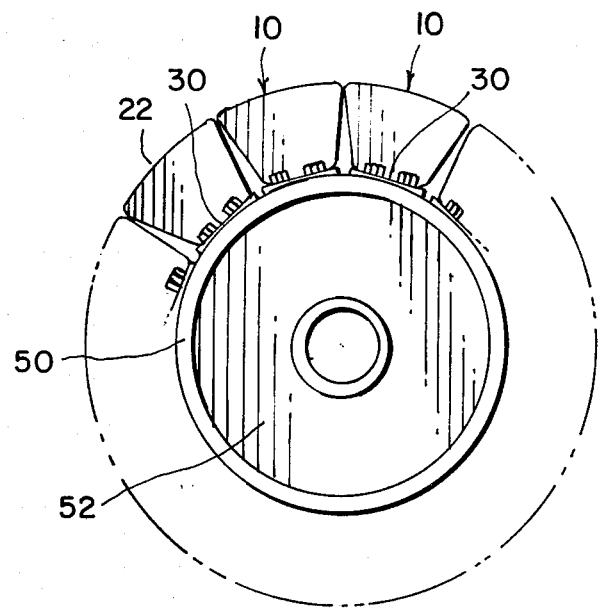
FIG. 1 comprises a partial side elevation illustrating tire sections mounted on a wheel rim according to one embodiment of the present invention.
Figure 2:
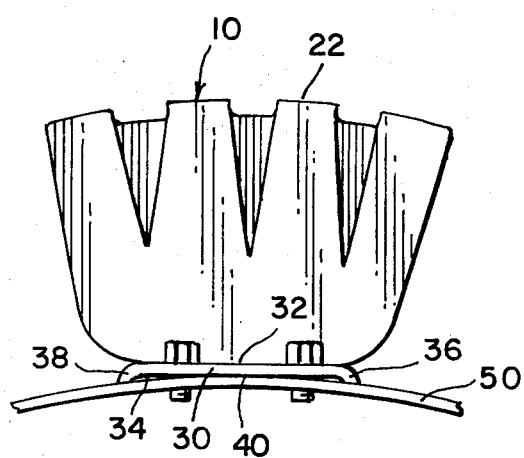
FIG. 2 comprises a side elevation of a tire section secured to a wheel rim through a sealing adaptor plate according to an embodiment of the present invention.
Figure 3:
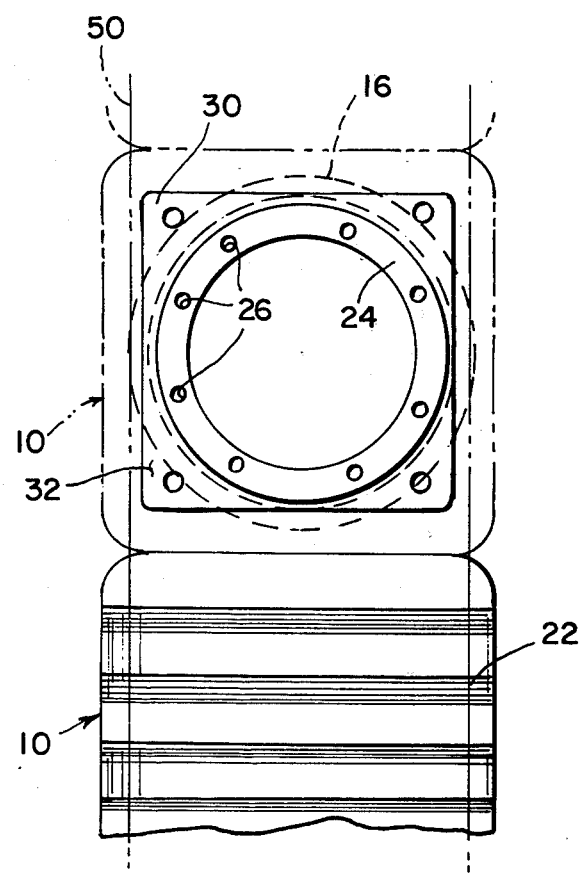
FIG. 3 comprises a partial plan view partially in section of a plurality of tire sections secured to a wheel rim, the sectional view illustrating a steel ring extending around the bottom area of a tire section, the steel ring being provided to secure the tire section to a wheel rim according to another embodiment of the present invention.
Figure 4:
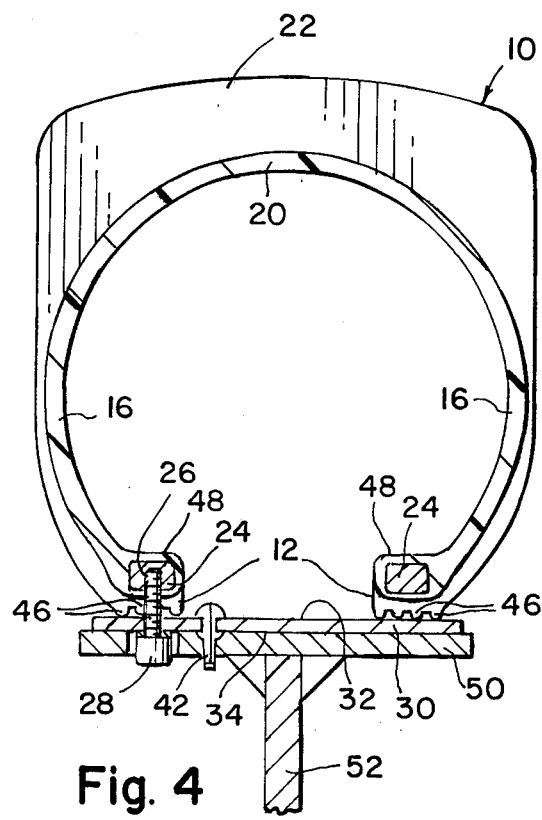
FIG. 4 comprises a front elevation in section of a tire section secured to a wheel rim through a steel ring in the bottom area of a tire, the steel ring extending around the periphery of the side walls of the tire and being positioned in the tire bead, bolts being used to fasten the tire section to the rim through the steel ring, a sealing surface being provided on the bottom area of the tire to provide an air-tight seal and an air valve being provided extending through the wheel rim and the sealing adaptor to which the tire section is mounted according to another embodiment of the present invention.
Figure 6:
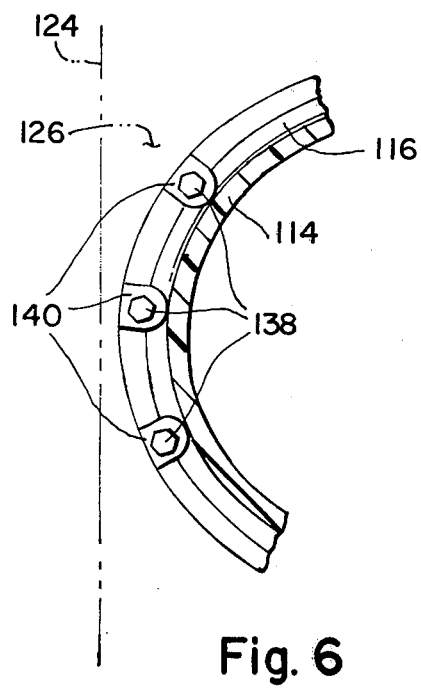
FIG. 6 comprises a partial plan view partially in section illustrating a plurality of clamps being used to clampingly seal a steel ring mounted in a tire bead of a tire section to a sealing adaptor plate mountable on a wheel rim according to another embodiment of the present invention.
Figure 5:
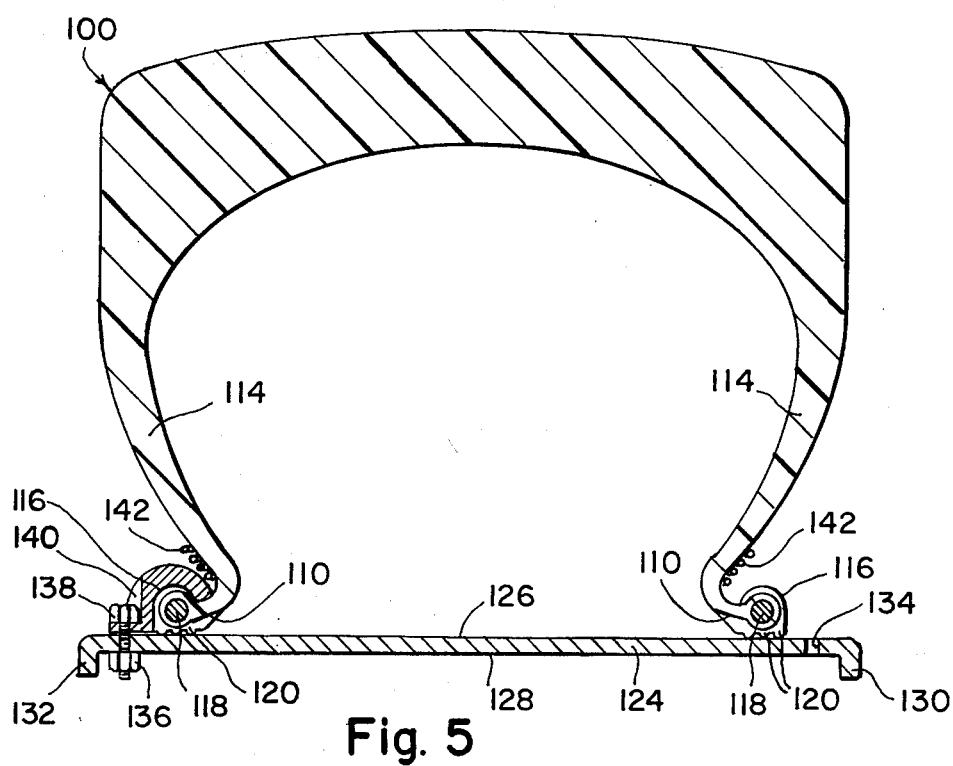
FIG. 5 comprises a partial front elevation partially in section of a tire section secured to a sealing adaptor plate through a steel ring mounted in the tire bead extending in the bottom area of the tire from the bottom periphery of the side walls, the steel ring in the tire bead being secured to the sealing adaptor by means of a clamp bolted to the sealing adaptor, a transverse steel belt being provided in the area of the steel ring and the tire bead in order to improve the dimensional stability of a tire in this area, sealing ribs being provided in the bottom area of the tire to provide an air-tight seal to the sealing adaptor according to another embodiment of the present invention.

Referring to the drawings and FIGS. 1-6, tire sections 10 are illustrated in FIGS. 1-4 and tire section 100 is illustrated in FIGS. 5 and 6, in which a tire having a bottom area 12 is provided which extends into a side wall 16 and a top wall 20, a tread wear area 22 extending from the top wall 20 and being integral with the tire section. A steel rim 24 is provided having a plurality of threaded openings 26 therein, the steel rim 24 being integral with the tire and in the embodiment illustrated is mounted in the inwardly facing bead 48. A plurality of sealing ribs 46 extend from the bottom area 12 to provide an airtight seal between the bottom area 12 of the tire section and a sealing adaptor plate 30 having an upper surface 32 which lies substantially in a flat plate and a bottom surface area 34 which is adapted to engage a tire rim surface 50 lying in a circumferential plane transversely extending from a wheel 52. In one embodiment, the bottom surface 34 comprises a substantially flat planar surface parallel to the flat planar surface 32. Bosses 36 and 38 extend from the surface 34 so that when the section 40 of the sealing adaptor plate 30 is positioned to tangentially engage the tire rim surface 50 lying in the circumferential plane, the ends of the plane 34 having the bosses 36 and 38 extending downwardly therefrom will engage the surface of such rim to properly position the tire section 10 on the rim 50. A threaded fastener 28 is provided to threadably engage the threaded opening 26 and pull the bottom area 12 into a sealing engagement with the surface 32 of the sealing adaptor 30. An air valve 42 is provided which extends through the wheel rim 50 and the sealing adaptor plate 30 for inflating or deflating the chamber within the tire section 10.

The ring 24 extends around the periphery of the side walls 16 which in the embodiment illustrated comprises a single side wall extending completely around the opening in the bottom of the tire section 10 which is provided in the bottom area. The steel ring 24 in this embodiment comprises a circular ring although any geometric configuration may be employed. By employing the circular ring 24, stress applied to the tire section 10 when in use on the wheel rim 50 is evenly distributed over a large section of the ring 24 to thereby assure that the seal between the ribs 46 in the bottom area 12 and the surface of area 32 of the sealing adaptor plate 30 is maintained.

In another embodiment, as illustrated in FIGS. 5 and 6, a tire section 100 is provided having a bottom area 110 which extends into side walls 114, the top wall and tread wear area not being illustrated. A steel ring 118 is mounted in the tire bead 116, the tire 100 being clamped to a sealing adaptor plate having a substantially planar top area 126 and a bottom area 128 similarly adapted to engage a tire rim surface lying in a circumferential plane transversely extending from a wheel. Bosses 130 and 132 extend from the surface 128 so that a section substantially in the center of sealing adaptor plate 124 may be employed to tangentially engage the circumferential plane of a wheel rim while the bosses 130 and 132 properly position the sealing adaptor plate 124 thereon and the tire section 100 mounted on the sealing adaptor plate 124. Clamp members 140 are provided to clampingly engage the outwardly projecting tire bead 116, the clamps 140 being secured to the sealing adaptor plate 124 by means of bolts 138 and nuts 136 passing through openings 134 in the sealing adaptor plate 124. A tire valve is provided in the sealing adaptor plate 124 in a manner similar to the tire valve 42 provided in sealing adaptor plate 30. A steel belt 142 extends around the base of the side walls 114 to provide dimensional stability for the side wall 114 in the area of clamp 140 and thereby prevent chaffing and similar wear which might be occasioned by the side wall 114 abraiding against the clamp 140. The ribs 120 are provided at the bottom of the bottom area 110 to provide an airtight seal between the tire section 100 and the sealing adaptor plate 124 on which it is mounted.

In use, a large wheel 52 having a wheel rim 50 thereon such as would be found on a front end loader or other heavy duty earth moving or construction equipment is provided with a plurality of tire sections 10 or 100. The tire sections are mounted on the wheel by means of the fastening of the tire sections to sealing adaptor plates 30 or 124 through the steel rings 24 or 118. An airtight seal is provided by the arrangement of threaded openings 26 for receiving a bolt 28 as is illustrated in FIG. 4 or clamps 140 which clampingly engage the steel ring in the tire bead. Should a tire section 10 or 100 become damaged or worn during use, the entire wheel would not have to be replaced, but only a section. This is easily accomplished by a mechanic or operator on the site and does not require the calling in of special equipment to jack up the vehicle and remove the wheel which can weigh in some cases up to several thousands of pounds.

The circular arrangement of the steel rings 24 or 118 and the circular side walls 16 and 114 which these rings respectively subtend provide for the substantially equal distribution of stress over a wide area of the ring 24 or 118 whether the stress is due to the lateral movement of the vehicle on which the tire sections 10 or 100 are mounted or the forward or backward movement of the vehicle and the like.

Although the invention has been described by reference to some embodiments, it is not intended that the novel tire section be limited thereby, but that modifications thereof are intended to be included as falling within the broad spirit and scope of the foregoing disclosure, the following claims and the appended drawing.

What is claimed is:

1. In a tire section apparatus individually securable to a wheel rim with other tire sections to form a tire having sections that are replaceable when worn or damaged, the improvement comprising substantially flexible pneumatic tire section means extending from a circular open bottom area into side walls, and a tread surface, said bottom area lying in a flat plane positionable next adjacent to a tire rim surface lying in a circumferential plane transversely extending from a wheel sealing adaptor plate means removably sealable to said tire section at said bottom area, circular steel ring mounting means substantially around the periphery of said bottom area for securing said tire section means next adjacent to a wheel rim through said adaptor plate and for substantially equal distribution of stress through said circular steel ring due to the lateral, forward or backward movement of a vehicle on which said tire section is mounted and to assure the seal of said tire section to said adaptor plate when said stress is applied to said tire section, said circular steel ring mounting means being integral with said tire section means, sealing means for removably securing said sealing adaptor plate means to said bottom area, said sealing means operatively engaging said circular steel ring mounting means.

2. The apparatus of claim 1 where said sealing adaptor plate means lies in a first flat plane parallel to and flushly abuttable against said bottom area, the surface opposite said first plane being adapted to engage a tire rim surface.

3. The apparatus of claim 2 where the opposite side of said first flat plane of said seal adaptor plate means comprises a second flat plane parallel to said first plane, said second plane having a section thereon adapted to tangentially engage a tire rim surface, boss means extending outwardly from the ends of said second plane, said boss means being opposite said tire section.

4. The apparatus of claim 1 further comprising fastening means for securing said tire section means through said adaptor plate means and said ring to a tire rim surface.

5. The apparatus of claim 1 where said tire section means comprises a pneumatic tire section and said steel ring is mounted in the bead of said tire section, said bead extending from the periphery of said side wall.

6. The apparatus of claim 5 where said sealing means comprises a plurality of threaded opening means in said steel ring mounting means, a plurality of bolt means for threadably engaging said threaded opening means to seal said adaptor plate means to said bottom area of said tire section means.

7. The apparatus of claim 6 where said bead extends inwardly from the side wall of said tire section means.

8. The apparatus of claim 6 comprising a plurality of continuous ribs extending downwardly from said bottom area to sealingly engage the first plane of said sealing adaptor plate means.

9. The apparatus of claim 5 where said sealing means comprises clamp means for clampingly securing said bead to said sealing adaptor plate means.

10. The apparatus of claim 9 where said bead extends outwardly from the side wall of said tire section means.

11. The apparatus of claim 9 further comprising reinforcing band means extending around the bottom periphery of said side wall means adjacent said bead.

12. The apparatus of claim 9 further comprising a plurality of continuous ribs extending downwardly from said bottom area to sealingly engage said first plane of said sealing adaptor plate means.

* * * * *